US008797815B2

(12) United States Patent
Schaefer

(10) Patent No.: US 8,797,815 B2
(45) Date of Patent: Aug. 5, 2014

(54) MEASURING DEVICE AND A MEASURING METHOD WITH HISTOGRAM FORMATION

(75) Inventor: Andrew Schaefer, Munich (DE)

(73) Assignee: Rohde & Schwarz GmbH & Co. Kg, Munich (DE)

( * ) Notice: Subject to any disclaimer, the term of this patent is extended or adjusted under 35 U.S.C. 154(b) by 93 days.

(21) Appl. No.: 13/469,440

(22) Filed: May 11, 2012

(65) Prior Publication Data

US 2012/0287738 A1  Nov. 15, 2012

(30) Foreign Application Priority Data

May 12, 2011 (DE) .......................... 10 2011 075 757

(51) Int. Cl.
*G11C 29/00* (2006.01)
*G06F 12/02* (2006.01)

(52) U.S. Cl.
USPC ....... 365/201; 365/230.03; 345/543; 345/564

(58) Field of Classification Search
USPC .......... 365/189.2, 230.03, 201; 345/543, 544, 345/564
See application file for complete search history.

(56) References Cited

U.S. PATENT DOCUMENTS

| 8,427,891 B2* | 4/2013 | Best ........................... 365/189.2 |
| 2009/0106512 A1* | 4/2009 | Jones et al. .................... 711/155 |
| 2011/0085372 A1* | 4/2011 | Fackenthal .................... 365/156 |

FOREIGN PATENT DOCUMENTS

| DE | 10 2008 004 978 A1 | 7/2008 |
| DE | 10 2008 053 204 A1 | 4/2009 |

* cited by examiner

*Primary Examiner* — Andrew Q Tran
(74) *Attorney, Agent, or Firm* — Ditthavong & Steiner, P.C.

(57) ABSTRACT

A measuring device for the efficient storage of test values and associated addresses provides a first storage region (30) and a second storage region (33). The first storage region (30) comprises a first number of memory cells (32) of a first cell size (31). The second storage region (33) comprises a second number of memory cells (35) of a second cell size (34). The measuring device further provides a third storage region (36) made from a second number of memory cells (38). A memory cell (38) of the third storage region (36) is rigidly assigned to each memory cell (35) of the second storage region (33). A control unit stores test values in the storage regions in a cumulative manner, separated according to addresses, for storing the test values only in the first storage region, if the test value for the respective address does not exceed the first cell size, for storing test values which exceed the first cell size jointly in memory cells of the first storage region and memory cells of the third storage region, and for storing associated addresses of the test values which exceed the first cell size in the corresponding memory cells of the second storage region.

11 Claims, 6 Drawing Sheets

MEASURING DEVICE AND A MEASURING METHOD WITH HISTOGRAM FORMATION

TECHNICAL FIELD

The invention relates to a measuring device and a measuring method, especially for the storage of test values.

BACKGROUND

Test values are conventionally registered by measuring devices and displayed on a display device. This display device is conventionally formed by a plurality of pixels. Accordingly, several test curves are often displayed in an overlapping manner on the display device. In this context, individual pixels form a part of several test curves. In order to display all of the test curves without a loss of information, it is therefore necessary to reserve a corresponding storage depth for each individual pixel. Especially with a high-resolution display device and a large number of displayable test curves, this is associated with a very large storage requirement.

DE 10 2008 053 204 A1 discloses a method for generating a histogram with mixed compartmental storage. Exploiting prior knowledge about the probability of occurrence, different storage depths for fixed addresses are reserved accordingly. The method disclosed in that context is disadvantageous, because it functions only by exploiting prior knowledge about the probability of occurrence.

A need therefore exists for providing a measuring method and a measuring device, which allow an efficient storage of the test values without prior knowledge 30 about the test values.

SUMMARY

A measuring device according to the invention for the storage 5 of test values and associated addresses provides a first storage region and a second storage region. The first storage region comprises a first number of memory cells of a first cell size. The second storage region comprises a second number of memory cells of a second cell size. The measuring device 10 further comprises a third storage region made from the second number of memory cells. Each memory cell of the second storage region is rigidly assigned to a memory cell of the third storage region.

With a method according to the invention for the storage of test values and associated addresses, a first storage region comprises a first number of memory cells of a first cell size and a second storage region made from a second number of memory cells of a second cell size. A third storage region comprises a second number of memory cells. Test values which do not exceed the first cell size are stored exclusively in memory cells of the first storage region. Test values which exceed the first cell size are stored jointly in memory cells of the first storage region and memory cells of the third storage region.

A very efficient storage of test values is achieved in this manner. The unused storage space is minimal.

Figures 1, 2, 3:
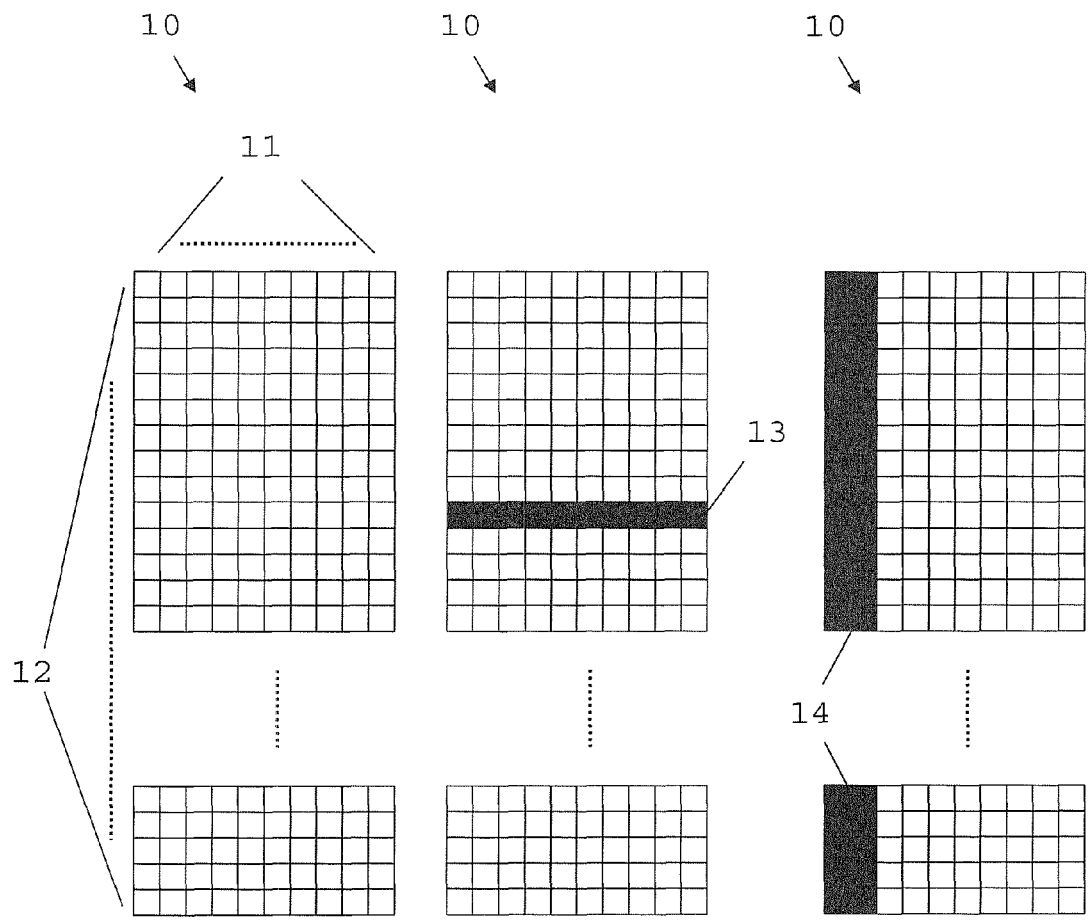
Figure 4:
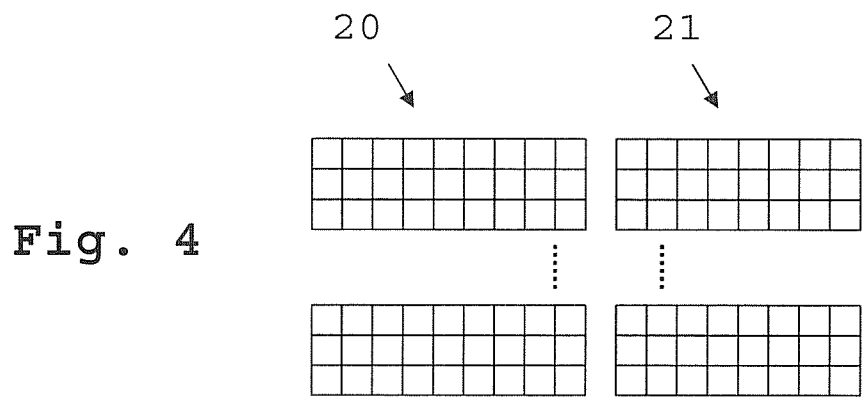
Figure 6:
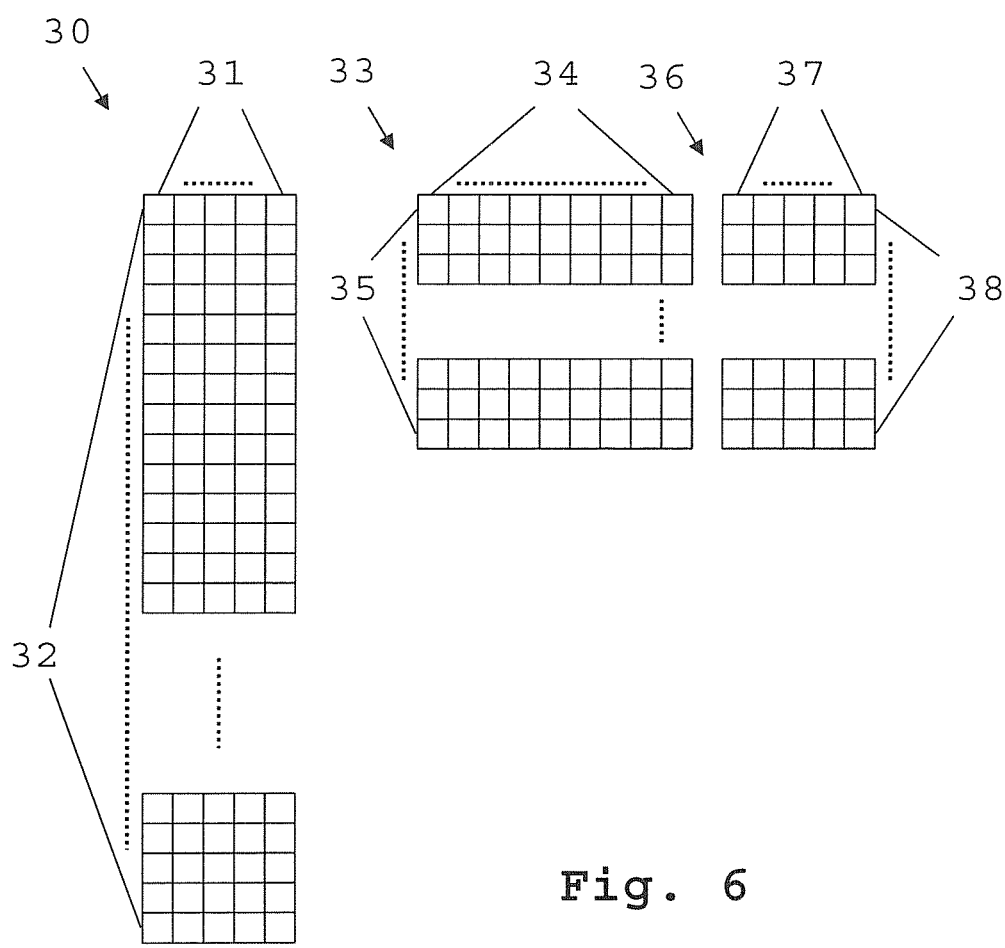
Figure 5:
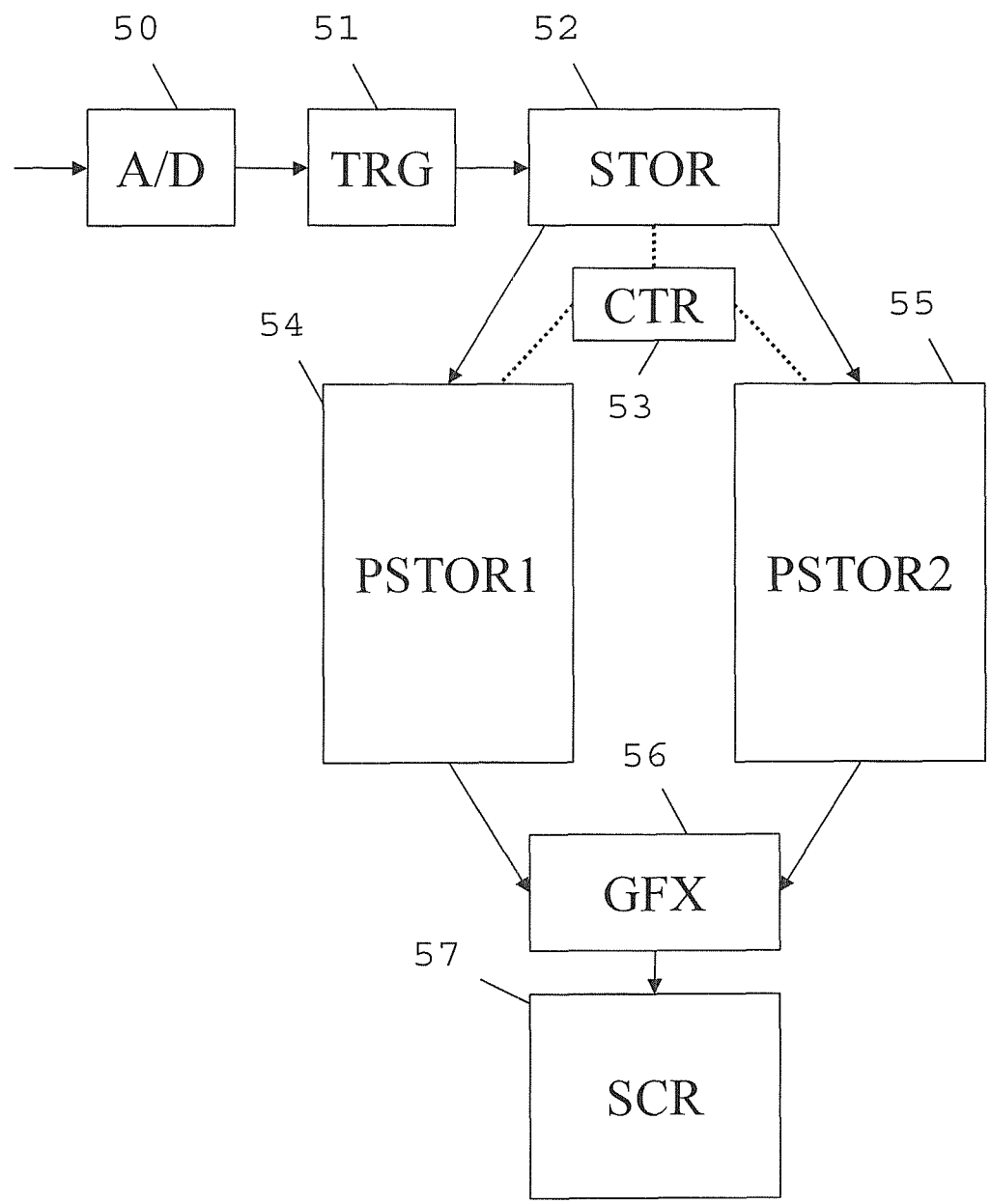
Figure 7:
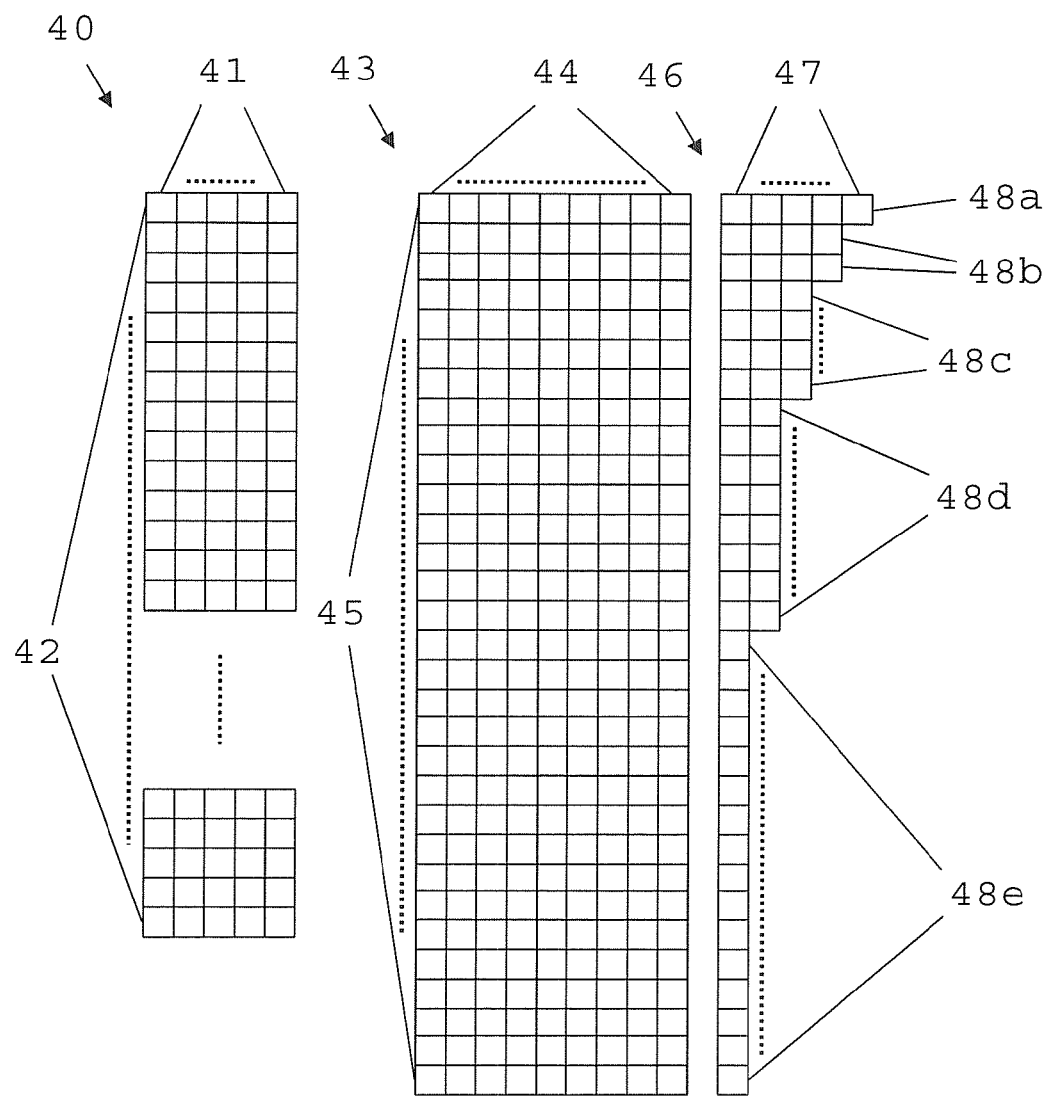
Figure 8:
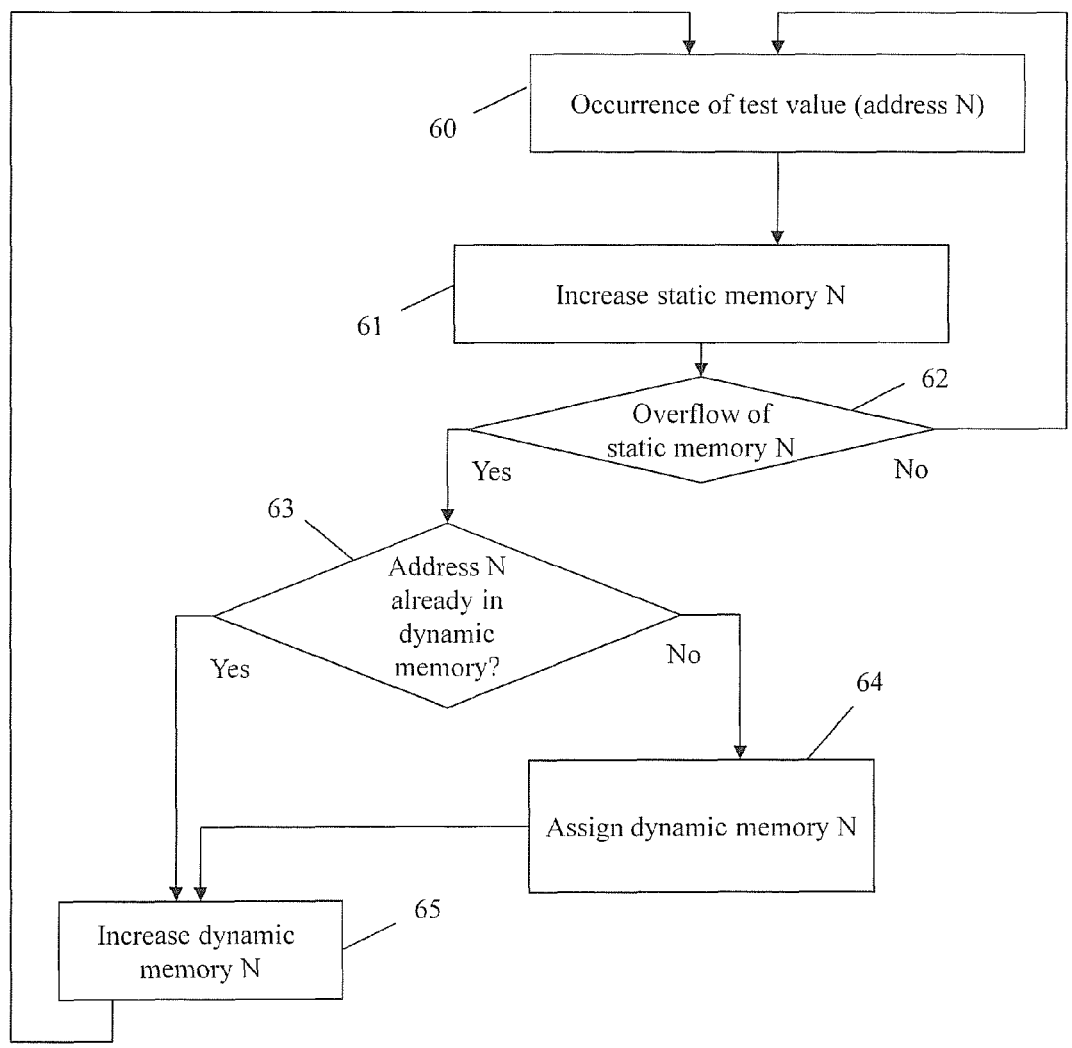
Figure 9:
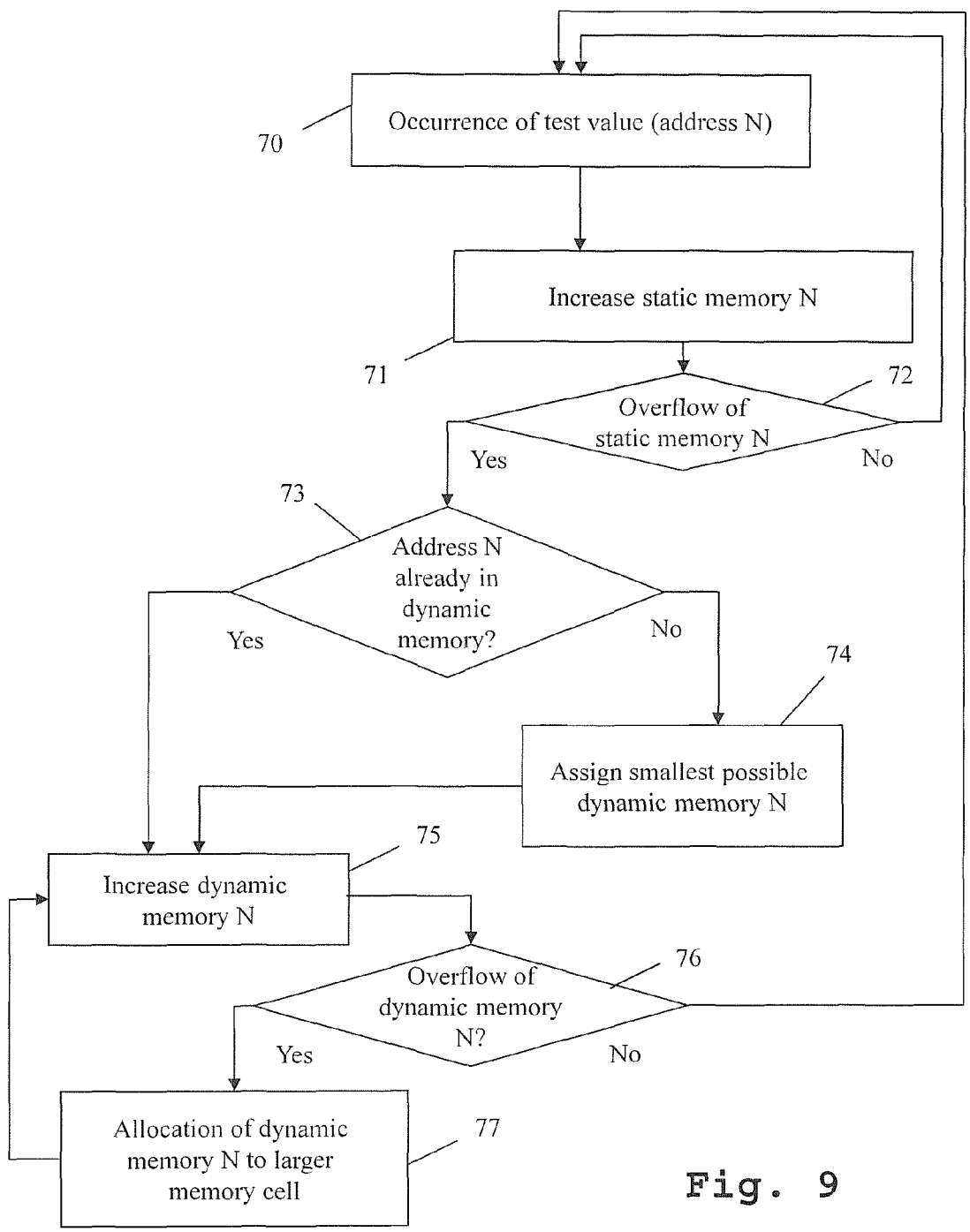

In the following paragraphs, the invention is described by way of example on the basis of the drawings which illustrate an advantageous exemplary embodiment of the invention. The drawings are as follows:

FIG. 1 shows a first exemplary storage region;
FIG. 2 shows a second exemplary storage region;
FIG. 3 shows a third exemplary storage region;
FIG. 4 shows a fourth exemplary storage region;
FIG. 5 shows a first exemplary embodiment of the measuring device according to the invention;
FIG. 6 shows a storage pattern of a second exemplary embodiment of the measuring device according to the invention;
FIG. 7 shows a storage pattern of a third exemplary embodiment of the measuring device according to the invention;
FIG. 8 shows a first exemplary embodiment of the measuring method according to the invention; and
FIG. 9 shows a second exemplary embodiment of the measuring method according to the invention.

DETAILED DESCRIPTION

The problem upon which the present invention is based is initially explained on the basis of FIGS. 1-4. Following this, the structure and method of functioning of the measuring device according to the invention is explained with reference to FIGS. 5-7. Finally, the method of functioning of the measuring method according to the invention is described with reference to FIG. 8 and FIG. 9. The explanation and description of identical elements in similar drawings has not been repeated in some cases.

FIG. 1 shows a first storage region 10 of a measuring device. The storage region 10 provides numerous memory cells 12, each of cell size 11. Each square illustrated in this drawing corresponds to a bit. Accordingly, each of the memory cells 12 corresponds to an address. The address in this case corresponds, for example, to a pixel of a screen column.

FIG. 2 shows a first exemplary occupation of the storage region 10 from FIG. 1. In the case illustrated here, all of the test values occur at a single address, that is, in a single memory cell 13. The remainder of the storage of the storage region 10 remains unused, or unoccupied. Only 10 bits can be stored in the memory cell 13 simultaneously.

FIG. 3 shows a second exemplary storage occupation of the storage region 10 from FIG. 1. Here, the test values to be stored are distributed uniformly over all of the memory cells 12 of the storage region 10. Accordingly, only the first two bits 14 of all memory cells 12 are occupied. The number of stored test values here corresponds to the number of stored test values in FIG. 2. The remainder of the memory of the storage region 10 is also unused, or unoccupied, here. Accordingly, this exemplary method is in fact very flexible, but at the same time very memory-intensive. In particular, it is necessary to reserve a maximum possible storage depth for the totality of the addresses.

FIG. 4 shows an alternative exemplary memory design. The test values to be stored here are stored in two separate storage regions 20 and 21. The address, for example, the pixel, at which the test value occurred, is stored in a first storage region 20. The associated test values are stored in a second storage region 21. In this context, each memory cell from the storage regions 20 is rigidly assigned to a memory cell from the storage region 21. That is to say, as soon as a test value of a given address occurs for the first time, this address is stored in a memory cell of the first storage region 20. The test value is stored in the associated memory cell of the storage region 21.

Advantageously, only a test value of one is stored for every occurrence of a test value at one address. As soon as a second test value occurs at an address which is already occupied in the first storage region 20, this test value is written in a cumulative manner into the associated memory cell of the second storage region 21. That is to say, if a test value is already stored there, the new test value is added to the original test value. Accordingly, the associated memory cell of the storage region 21 is incremented by one upon the occurrence of the second test value at the given address.

This storage method is very efficient if the test values are concentrated at a few addresses. It is then only necessary to store the addresses in the first storage region 20 and the test values in the second storage region 21. This leads to a very small, unused, region of memory in the storage region 21. However, if the test values are distributed over a plurality of addresses, a very large first storage region 20 is required in order to store this plurality of addresses. At the same time, however, the second storage region 21 is used only minimally.

FIG. 5 shows an exemplary embodiment of the measuring device according to the invention. An analog-digital converter 50 is connected to a trigger device 51. The trigger device 51 is connected in turn to a storage unit 52. The storage unit 52 is connected to a control unit 53, a first pixel store 54 and a second pixel store 55. Furthermore, the control unit 53 is also connected to the first pixel store 54 and the second pixel store 55. Moreover, the pixel stores 54 and 55 are connected to a graphic processing unit 56. This is connected in turn to a display device 57.

An analog test value is supplied to the analog-digital converter 50 and converted by the latter into a digital test value. A series of such test values is supplied to the trigger device 51. This performs a triggering. The triggered test values are supplied to the storage unit 52. This temporarily buffers the test values. The control unit 53 determines in which of the pixel stores 54, 55 the test values buffered by the storage unit 52 are stored. The precise function of the control unit 53 and the pixel store 54, 55 is explained in greater detail with reference to FIG. 6 and FIG. 7. The graphic processing unit 56 reads out the pixel store 54, 55 and generates from it a control signal for the display device 57.

FIG. 6 shows a second exemplary embodiment of the measuring device according to the invention. Several storage regions 30, 33, 36, which are arranged in the pixel stores 54, 55 from FIG. 5, are presented here. A first storage region 30 corresponds to the pixel store 54. A second storage region 33 and a third storage region 36 correspond to the pixel store 55. The first storage region 30 provides a first number of memory cells 32, each of a first cell size 31. The second storage region 33 provides a second number of memory cells 35, each of a second cell size 34. The third storage region 36 provides a third number of memory cells 38, each of a third cell size 37.

The first number of memory cells 32 here corresponds to the number of possible addresses, for example, the number of pixels of the display device 57 from FIG. 5. Each of the memory cells 32 accordingly provides a cell size 31, in this case, of only five bits. Incoming test values are initially stored in the first storage region 30. Each of the memory cells 32 in this context is rigidly assigned to an address. In all of the exemplary embodiments, only one bit is advantageously stored for every test value. This corresponds to the occurrence of one test value at each address. In the event of a recurrence of test values at the addresses, the stored test value is therefore advantageously increased by one in each case. Accordingly, only 32 test values can be stored in the cell size 31 reserved here.

Storage is continued in the first storage region 30 only if this number is not reached. However, as soon as a 33rd test value occurs at a given address, the control unit 53 from FIG. 5 stores this address in the second storage region 33 in a memory cell not yet used. The additional test value is stored in the third storage region 36 in the memory cell which corresponds to the address. Accordingly, the maximum storage depth for this address is expanded by the cell size 37 of the third storage region 36. Here, this amounts to 5 bits. That is, test values up to 10-bits can be stored for this address.

In this context, the second storage region 33 and the third storage region 36 provide a significantly smaller number of memory cells 35 and 38, respectively, than the first storage region 30. The memory cells 35 and 38 are thus assigned in a dynamic manner. That is, they are not assigned to fixed addresses. Only if the first storage region 30 at a fixed address is insufficient is additional storage assigned to this address in the second storage region 33 and third storage region 36. This means that the proportion of unused storage is significantly reduced. The pixel stores 54 and 55 from FIG. 5 can accordingly be substantially smaller in total than a conventional storage as shown in FIGS. 1-3.

FIG. 7 shows a third exemplary embodiment of the measuring device according to the invention. This drawing corresponds to the illustration from FIG. 6. That is, a first storage region 40 corresponds to the first pixel store 54 from FIG. 5, while a second storage region 43 and a third storage region 46 correspond to the second pixel store 55 from FIG. 5. The first storage region 40 provides a number of memory cells 42, which corresponds to the number of possible addresses, that is, for example, to the number of pixels of the display device 57 from FIG. 5. These memory cells 42 are of a cell size 41, in this case, for example, of five bits. The second storage region 43 and the third storage region 46 provide a number of memory cells 45.

Each memory cell 45 of the second storage region 43 is rigidly assigned to a memory cell 48a, 48b, 48c, 48d, 48e of the third storage region 46. The memory cells 45 of the second storage region 43 provide identical cell sizes 44. This cell size 44 corresponds to the memory necessary for the storage of an address. The memory cells 48a, 48b, 48c, 48d, 48e of the third storage region in this context provide different cell sizes 47. For example, the memory cell 48a here provides a cell size of five bits. The memory cells 48b provide a cell size of four bits. The memory cells 48c provide a cell size of three bits. The memory cells 48d provide a cell size of two bits. The memory cells 48e provide a cell size of one bit.

The basic method of functioning corresponds to the method of functioning illustrated on the basis of FIG. 6. As soon as the cell size 41 is insufficient to store a further test value with an address of the first storage region 40, the control unit 53 from FIG. 5 assigns a memory cell from the second storage region 43 and from the third storage region 46 respectively. The address is stored in the memory cell 45 of the second storage region 43. The assigned memory cell 48a, 48b, 48c, 48d, 48e of the third storage region 46 is used together with the memory cell from the first storage region 40 for the storage of the test values.

In this context, the control device 53 assigns a smallest possible unoccupied memory cell 48a, 48b, 48c, 48d, 48e from the third storage region 46 and the associated memory cell from the second storage region 43. That is, if a 33rd test value is stored here, one of the memory cells 48e and the associated memory cell 45 from the second storage region 43 is assigned, provided one of the memory cells 48e is not yet assigned to an address. If all of the memory cells 48e are already occupied, one of the memory cells 48d and the associated memory cell of the second storage region 43 is assigned.

If the case occurs that the cell size 41 was insufficient to store all test values, and accordingly, a memory cell 48e and the associated memory cell from the second storage region 43 is used, the control unit 53 assigns new memory cells in the second storage region 43 and third storage region 46. Accordingly, it stores the test value in one of the memory cells 48e while it stores the address in the associated memory 30 cell of the storage region 43. Following this, the original memory cells are deleted. This procedure reduces the unused storage even further. Wider memory cells of the third storage region 46 are used only if necessary.

FIG. 8 shows a first exemplary embodiment of the measuring method according to the invention. Only the storage procedure will be explained here. Otherwise, the measuring method corresponds with conventional measuring methods. In a first step 60, a test value occurs at an address N. In a second step 61, the static memory N associated with the address is increased by one. In a third step 62, a check is carried out to determine whether an overflow of the static memory N has occurred. If no overflow of the static memory N has occurred, the storage of further test values is continued. If another test value is present at the address N, the first step 60 is continued. However, if an overflow of the static memory N occurs, a check is carried out in a fourth step 63 to determine whether the address N is already stored in the dynamic memory. If this is not the case, the address N is generated in a fifth step 64.

Following this, in a sixth step 65, the value stored in the dynamic memory is increased. However, if it is determined in the fourth step 63 that the address N is already stored in the dynamic memory, the sixth step 65 is continued directly. Following this, the storage of further test values is continued. If another test value occurs at the address N, the first step 60 is continued accordingly. The method described on the basis of FIG. 8 corresponds to the device described on the basis of FIG. 6.

FIG. 9 shows a second exemplary embodiment of the measuring method according to the invention. Here also, only the storage procedure is described. The exemplary embodiment shown here corresponds largely to the exemplary embodiment from FIG. 8. The steps 70-75 correspond largely to the steps 60-65 from FIG. 8. Only the fifth step 74 differs insofar as, instead of a random dynamic memory, a smallest possible free dynamic memory is assigned. That is to say, among the available memory cells of the dynamic memory, the smallest possible free memory cell necessary for the storage of the present test value is selected. After the implementation of the sixth step 75, a check is now carried out in a seventh step 76 to determine whether an overflow of the currently assigned dynamic memory N has occurred. If this is not the case, the storage of further test values is continued.

If a new test value is present at the address N, the first step 70 is continued. However, if an overflow of the currently assigned dynamic memory N occurs, the dynamic memory N is assigned in an eighth step 77 to a larger memory cell. That is, the value stored in the original memory cell is copied into a larger memory cell. The address is also assigned to the larger memory cell. Following this, the original memory cell is deleted. The sixth step 75 is continued. The method shown here corresponds to the device from FIG. 7.

The invention is not restricted to the exemplary embodiment presented. Accordingly, different cell sizes from those indicated can be used. Moreover, a different number of memory cells is conceivable. All of the features described above or illustrated in the drawings can be advantageously combined with one another as required within the framework of the invention.

The invention claimed is:

1. A measuring device, comprising:
  a first storage region having a first number of memory cells of a first cell size, the first number of memory cells corresponding to a number of addresses associated with stored test values measured by the measuring device, with every memory cell of the first storage region being rigidly assigned to an address;
  a second storage region having a second number of memory cells of a second cell size;
  a third storage region having a third number of memory cells of a third cell size; and
  a control unit for storing test values in the storage regions in a cumulative manner, separated according to addresses, for storing the test values only in the first storage region, if the test value for the respective address does not exceed the first cell size, for storing test values which exceed the first cell size jointly in memory cells of the first storage region and memory cells of the third storage region, and for storing associated addresses of the test values which exceed the first cell size in the corresponding memory cells of the second storage region.

2. The measuring device according to claim 1, wherein the second number is smaller than the first number, and wherein the second cell size corresponds to the required memory space for the storage of the address.

3. The measuring device according to claim 1, wherein the memory cells of the third storage region provide identical cell sizes.

4. The measuring device according to claim 1, wherein the memory cells of the third storage region provide different cell sizes, and wherein the control unit stores test values, which exceed the first cell size jointly in memory cells of the first storage region and in smallest possible memory cells of the third storage region which are jointly sufficiently large for these test values.

5. The measuring device according to claim 4, wherein the control unit stores test values which exceed the cell size of the memory cell of the third storage region in which they are stored in a larger memory cell of the third storage region, updates the address of the associated memory cell of the second storage region.

6. A method comprising:
  providing a first storage region and storing test values measured by a measuring device in the first storage region having a first number of memory cells of a first cell size, the first number of memory cells corresponding to a number of addresses associated with the stored test values, and rigidly assigning every memory cell of the first storage region to an address;
  providing a second storage region having a second number of memory cells of a second cell size;
  providing a third storage region having a third number of memory cells of a third cell size; and
  providing a control unit for performing the steps of:
    storing the test values in the storage regions in a cumulative manner, separated according to addresses,
    storing the test values only in the first storage region, if the test value for the respective address does not exceed the first cell size,
    storing test values which exceed the first cell size jointly in memory cells of the first storage region and memory cells of the third storage region, and
    storing associated addresses of the test values which exceed the first cell size in the corresponding memory cells of the second storage region.

7. The method according to claim 6, further comprising:
storing addresses associated with test values which exceed the first cell size in memory cells of the second storage region, wherein the first number corresponds to the number of possible addresses;

rigidly assigning each memory cell of the first storage region to an address, and rigidly assigning each memory cell of the second storage region to a memory cell of the third storage region.

8. The method according to claim 6, wherein the second number is smaller than the first number, and the second cell size corresponds to memory space required for the storage of the address.

9. The method according to claim 6, further comprising, providing the memory cells of the third storage region as identical cell sizes.

10. The method according to claim 6, further comprising, providing the memory cells of the third storage region in different cell sizes, and jointly storing test values which exceed the first cell size in memory cells of the first storage region and in smallest possible memory cells of the third storage region, which are jointly sufficiently large for these test values.

11. The method according to claim 10, further comprising, storing test values which exceed the cell size of the memory cell of the third storage region in combination with the cell size of the memory cell of the first storage region in which they are stored in a larger memory cell of the third storage region, and, in this case, updating the address of the associated memory cell of the second storage region.

* * * * *